(12) United States Patent
Lee (10) Patent No.: US 8,335,549 B2
(45) Date of Patent: Dec. 18, 2012

(54) METHOD FOR POWER MANAGEMENT OF MOBILE COMMUNICATION TERMINAL AND MOBILE COMMUNICATION TERMINAL USING THIS METHOD

(75) Inventor: Minju Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 13/006,223

(22) Filed: Jan. 13, 2011

(65) Prior Publication Data

US 2011/0312385 A1 Dec. 22, 2011

(30) Foreign Application Priority Data

Jun. 16, 2010 (KR) .................. 10-2010-0057262

(51) Int. Cl.
*H04B 1/38* (2006.01)
(52) U.S. Cl. ........ 455/574; 455/423; 455/424; 455/425; 455/571; 455/127.5
(58) Field of Classification Search .......... 455/423–435, 455/571–574, 127.5
See application file for complete search history.

(56) References Cited

U.S. PATENT DOCUMENTS

| | | | |
|---|---|---|---|
| 4,912,774 A * | 3/1990 | Saito | .............. 455/117 |
| 6,314,308 B1 | 11/2001 | Sheynblat et al. | |
| 2002/0082059 A1 | 6/2002 | Nariai et al. | |
| 2002/0177475 A1 | 11/2002 | Park | |
| 2006/0068855 A1 | 3/2006 | Miyazaki et al. | |
| 2007/0123304 A1 * | 5/2007 | Pattenden et al. | .............. 455/557 |

FOREIGN PATENT DOCUMENTS

| | | |
|---|---|---|
| EP | 1 471 361 A2 | 10/2004 |
| GB | 2 446 168 A | 8/2008 |

OTHER PUBLICATIONS

European Search for Application 11152649.7 dated Sep. 27, 2011.

* cited by examiner

*Primary Examiner* — Wayne Cai
(74) *Attorney, Agent, or Firm* — KED & Associates, LLP (57) ABSTRACT

A power management method of a mobile communication terminal may include sensing a characteristic of a battery coupled to the mobile communication terminal, providing a power-off suspend mode for the mobile communication terminal when the sensed battery characteristic falls below a predetermined value, and further sensing the characteristic of the battery while the mobile communication terminal is in the power-off suspend mode. This may include performing a reset of the mobile communication terminal when the further sensed characteristic rises above the predetermined value while the mobile communication terminal is in the power-off suspend mode, and performing a power-off of the mobile communication terminal when the further sensed characteristic remains below the predetermined value for a prescribed time while the mobile communication terminal is in the power-off suspend mode.

35 Claims, 4 Drawing Sheets

METHOD FOR POWER MANAGEMENT OF MOBILE COMMUNICATION TERMINAL AND MOBILE COMMUNICATION TERMINAL USING THIS METHOD

CROSS-REFERENCE TO RELATED APPLICATION

This application claims priority from Korean Application No. 10-2010-0057262, filed Jun. 16, 2010, the subject matter of which is incorporated herein by reference.

BACKGROUND

1. Field

The present disclosure relates to a mobile communication terminal and a power management method of a mobile communication terminal.

2. Background

Terminals may be divided into a mobile terminal (or a portable terminal) and a stationary terminal based on whether terminals are movable. Mobile terminals may be divided into a handheld terminal and a vehicle mount terminal based on whether users can directly carry the terminal.

Terminals can support more complicated functions such as capturing images or video, reproducing music or video files, playing games, receiving broadcast signals, and/or the like. By comprehensively and collectively implementing such functions, mobile terminals may be embodied in the form of a multimedia player or device. In order to support and increase functions of the terminals, improvement of structural part(s) and/or software part(s) of terminals may be needed.

A mobile terminal may include a battery pack for supplying power required for operation of each terminal component. Such a battery pack may supply power for a limited period of time, and a threshold voltage may be set in the terminal as a minimum potential for terminal operation, thereby powering off the terminal when the battery potential drops below the threshold voltage.

The mobile terminal may have inconvenience in that the mobile terminal may be consistently powered off even for a battery potential drop generated due to temporary external factors such as an instantaneous contact failure between a battery and a battery terminal, thereby forcing the user to power on the terminal potential each time to use the terminal.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present disclosure may be described in detail with reference to the accompanying drawings, where those components are rendered a same reference number that are the same or are in correspondence, regardless of figure number, and redundant explanations may be omitted. If a detailed explanation for a related known function or construction is considered to unnecessarily divert the gist of the present disclosure, such explanation has been omitted but would be understood by those skilled in the art.

In the following description, usage of suffixes such as 'module', 'part' or 'unit' used for referring to elements may be provided merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings.

Overall Configuration of Mobile Terminal

The mobile terminal may include mobile phones, smart phones, notebook computers, digital broadcast receivers, Personal Digital Assistants (PDAs), Portable Multimedia Player (PMPs), navigation devices, and/or the like. It would be understood by a person in the art that the configuration according to embodiments may also be applicable to fixed types of terminals, such as digital TVs, desk top computers, and/or the like, except for any elements especially configured for a mobile purpose.

Figure 1:
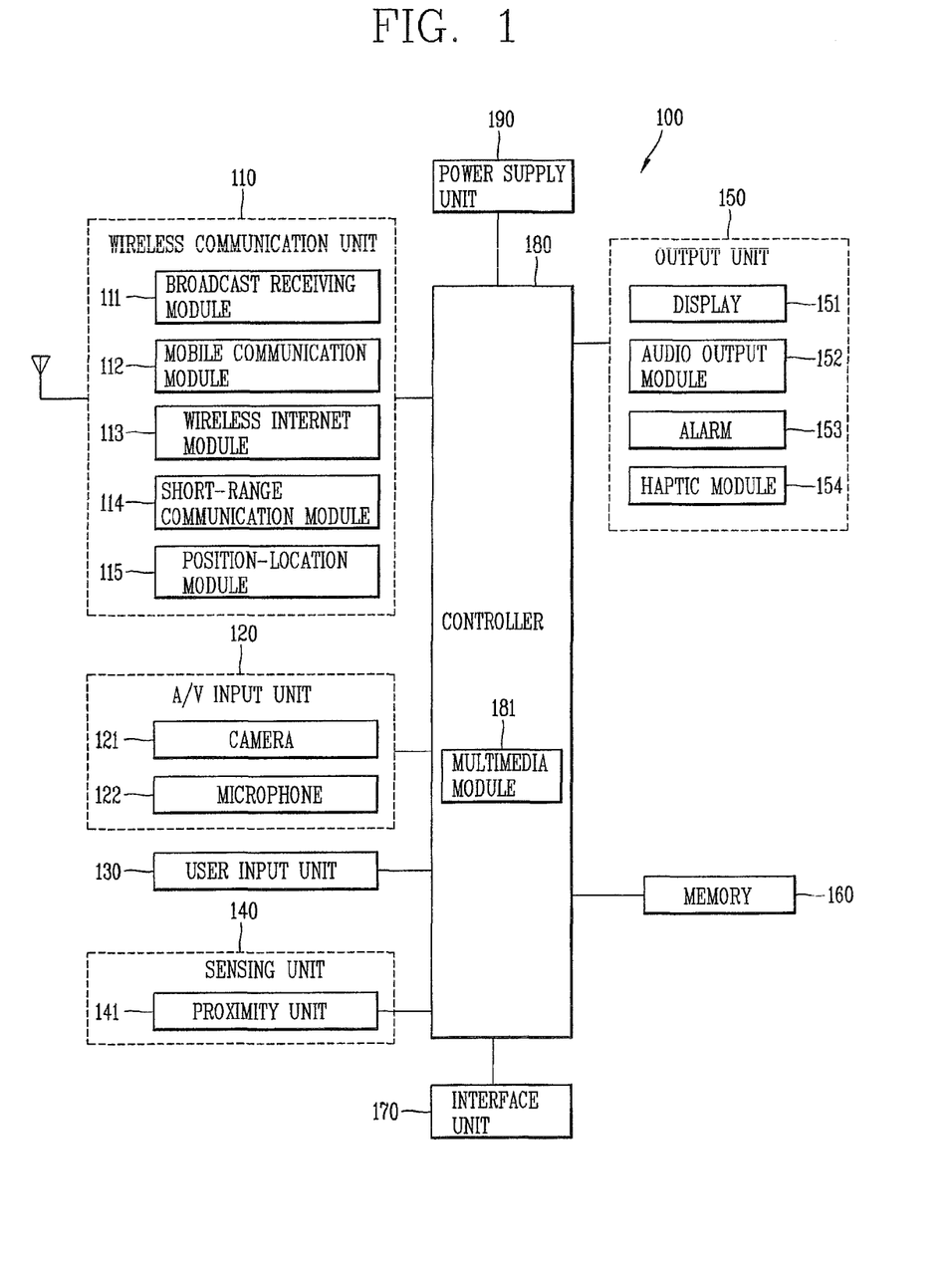
FIG. 1 is a schematic block diagram of a mobile terminal according to an exemplary embodiment.

FIG. 1 is a schematic block diagram of a mobile terminal according to an embodiment. Other embodiments and configurations may also be provided.

A mobile terminal 100 may include a wireless communication unit 110, an Audio/Video (A/V) input unit 120, a user input unit 130, a sensing unit 140, an output unit 150, a memory 160, an interface unit 170, a controller 180, and a power supply unit 190, and/or the like. The mobile terminal 100 may also be considered a mobile communication terminal. FIG. 1 shows the mobile terminal 100 as having various components, although it should be understood that implementing all of the illustrated components is not a requirement. Greater or fewer components may alternatively be implemented.

The wireless communication unit 110 may include one or more components allowing radio communication between the mobile terminal 100 and a wireless communication system or a network in which the mobile terminal 100 is located. For example, the wireless communication unit 110 may include at least one of a broadcast receiving module 111, a mobile communication module 112, a wireless Internet module 113, a short-range communication module 114, and/or a position-location module 115.

The broadcast receiving module 111 may receive broadcast signals and/or broadcast associated information from an external broadcast management server (or other network entity) via a broadcast channel. The broadcast associated information may refer to information associated with a broadcast channel, a broadcast program and/or a broadcast service provider. The broadcast associated information may also be provided via a mobile communication network and the broadcast associated information may be received by the mobile communication module 112. Broadcast signals and/or broadcast-associated information received via the broadcast receiving module 111 may be stored in the memory 160 (or other type of storage medium).

The mobile communication module 112 may transmit and/or receive radio signals to and/or from at least one of a base station (e.g., access point, Node B, and/or the like), an external terminal (e.g., other user devices) and/or a server (or other network entities). Such radio signals may include a voice call signal, a video call signal and/or various types of data based on text and/or multimedia message transmission and/or reception.

The wireless Internet module 113 may support wireless Internet access for the mobile terminal 100. The wireless Internet module 113 may be internally or externally coupled to the mobile terminal 100. The wireless Internet access technique may include a WLAN (Wireless LAN) (Wi-Fi), Wibro (Wireless broadband), Wimax (World Interoperability for Microwave Access), HSDPA (High Speed Downlink Packet Access), LTE (Long Term Evolution), LTE-A (Long Term Evolution Advanced) and/or the like.

The short-range communication module 114 may support short range communications. Some examples of short-range communication technology include Bluetooth™, Radio Frequency IDentification (RFID), Infrared Data Association (IrDA), Ultra-WideBand (UWB), ZigBee™, and/or the like.

The position-location module 115 may check or acquire a location (or position) of the mobile terminal 100. A Global Positioning System (GPS) may be an example of the position-location module 115.

The A/V input unit 120 may receive an audio or image signal. The A/V input unit 120 may include a camera 121 (or other image capture device) or a microphone 122 (or other sound pick-up device). The camera 121 may process image frames of still pictures or video obtained by an image capture device in a video capturing mode or an image capturing mode. The processed image frames may be displayed on a display 151 (or other visual output device).

The image frames processed by the camera 121 may be stored in the memory 160 (or other storage medium) and/or transmitted via the wireless communication unit 110. Two or more cameras 121 may be provided based on the configuration of the mobile terminal 100.

The microphone 122 may receive sounds (audible data) via a microphone (or the like) in a phone call mode, a recording mode, a voice recognition mode, and/or the like, and may process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal 100. The user input unit 130 may include a keypad, a dome switch, a touch pad (e.g., a touch sensitive member that detects changes in resistance, pressure, capacitance, and/or the like, due to being contacted), a jog wheel, a jog switch, and/or the like.

The sensing unit 140 (or other detection means) may detect a current status (or state) of the mobile terminal 100 such as an opened state or a closed state of the mobile terminal 100, a location of the mobile terminal 100, presence or absence of user contact with the mobile terminal 100 (i.e., touch inputs), orientation of the mobile terminal 100, an acceleration or deceleration movement and direction of the mobile terminal 100, and/or the like, and the sensing unit 140 may generate commands or signals for controlling operation of the mobile terminal 100. For example, when the mobile terminal 100 is implemented as a slide type mobile phone, the sensing unit 140 may sense whether the slide phone is opened or closed.

The sensing unit 140 may detect whether or not the power supply unit 190 supplies power or whether or not the interface unit 170 is coupled with an external device. The sensing unit 140 may include a proximity unit 141.

As will be described below, the sensing unit 140 may sense a characteristic of a battery coupled to the mobile terminal 100.

The output unit 150 may provide outputs in a visual, audible, and/or tactile manner (e.g., an audio signal, an image signal, an alarm signal, a vibration signal, etc.). The output unit 150 may include the display 151, an audio output module 152, an alarm 153, a haptic module 154, and/or the like.

The display 151 may display (output) information processed in the mobile terminal 100. For example, when the mobile terminal 100 is in a phone call mode, the display 151 may display a User Interface (UI) or a Graphic User Interface (GUI) associated with a call or other communication, such as text messaging, multimedia file downloading, and/or the like. When the mobile terminal 100 is in a video call mode or in an image capturing mode, the display 151 may display a captured image and/or received image, a UI or GUI that shows videos or images and functions related thereto, and/or the like.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, an e-ink display and/or the like.

Some of the displays may be transparent or light-transmissive to allow viewing of an exterior, which may be called transparent displays. A transparent display may be a Transparent Organic Light Emitting Diode (TOLED) display, and/or the like, for example. Through such configuration, the user may view an object positioned at a rear side of the terminal body through the region occupied by the display 151 of the terminal body.

The mobile terminal 100 may include two or more display units (or other display means) based on its particular desired embodiment. For example, a plurality of display units may be separately or integrally provided on one surface of the mobile terminal 100, and/or may be separately provided on mutually different surfaces.

When the display 151 and a sensor (hereafter referred to as a touch sensor) for detecting a touch operation are overlaid in a layered manner to form a touch screen, the display 151 may function as both an input device and an output device. The touch sensor may have a form of a touch film, a touch sheet, a touch pad, and/or the like.

The touch sensor may convert pressure applied to a particular portion of the display 151 or a change in capacitance or the like generated at a particular portion of the display 151 into an electrical input signal. The touch sensor may detect pressure when a touch is applied, as well as the touched position and area.

When there is a touch input with respect to the touch sensor, a corresponding signal may be transmitted to a touch controller. The touch controller may process the signals and transmit corresponding data to the controller 180. Accordingly, the controller 180 may recognize which portion of the display 151 has been touched.

A proximity unit 141 may be provided within or near the touch screen. The proximity unit 141 may detect presence or absence of an object relative to a certain detection surface or an object that exists nearby by using a force of electromagnetism or infrared rays without a physical contact. Thus, the proximity unit 141 may have a considerably longer life span as compared with a contact type sensor, and the proximity unit 141 may be utilized for various purposes.

Examples of the proximity unit 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and/or the like. In an example where the touch screen is the capacitance type, proximity of the pointer may be detected by a change in electric field based on proximity of the pointer. In this example, the touch screen (touch sensor) may be classified as a proximity unit.

The audio output module 152 may convert and output sound audio data received from the wireless communication unit 110 and/or stored in the memory 160 in a call signal reception mode, a call mode, a record mode, a voice recognition mode, a broadcast reception mode, and/or the like. The audio output module 152 may provide audible outputs related to a particular function performed by the mobile terminal 100 (e.g., a call signal reception sound, a message reception sound, etc.). The audio output module 152 may include a receiver, a speaker, a buzzer, and/or other sound generating device.

The alarm 153 (or other type of user notification means) may provide outputs to inform about occurrence of an event of the mobile terminal 100. Events may include call reception, message reception, key signal inputs, a touch input etc. In addition to audio or video outputs, the alarm 153 may provide outputs in a different manner to inform about occurrence of an event. For example, the alarm 153 may provide an output in the form of vibrations (or other tactile or sensible outputs). When a call, a message, and/or some other incoming communication is received, the alarm 153 may provide tactile outputs (i.e., vibrations) to inform the user thereof. By providing such tactile outputs, the user may recognize an occurrence of various events even when his mobile phone is in the user's pocket. Outputs informing about occurrence of an event may be also provided via the display 151 or the audio output module 152. The display 151 and the audio output module 152 may be classified as a part of the alarm 153.

The haptic module 154 may generate various tactile effects the user may feel. An example of the tactile effects generated by the haptic module 154 may be a vibration. Strength and pattern of the haptic module 154 may be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and/or the like, an effect by reproducing a sense of cold and warmth using an element that can absorb or generate heat.

The haptic module 154 may allow the user to feel a tactile effect through a muscle sensation such as fingers or arm of the user, as well as transferring the tactile effect through a direct contact. Two or more haptic modules 154 may be provided based on the configuration of the mobile terminal 100.

The memory 160 may store software programs used for processing and controlling operations performed by the controller 180, and/or may temporarily store data (e.g., a phonebook, messages, still images, video, etc.) that are inputted or outputted. The memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and/or an optical disk. The mobile terminal 100 may operate in relation to a web storage device that performs the storage function of the memory 160 over the Internet.

The interface unit 170 may serve as an interface with every external device connected with the mobile terminal 100. For example, the external devices may transmit data to an external device, receive and transmit power to each element of the mobile terminal 100, and/or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating authority of using the mobile terminal 100 and may include a user identity module (UIM), a subscriber identity module (SIM), a universal subscriber identity module (USIM), and/or the like. The device having the identification module (hereafter referred to as an identifying device) may take the form of a smart card. Accordingly, the identifying device may be connected via a port with the mobile terminal 100.

When the mobile terminal 100 is connected with an external cradle, the interface unit 170 may serve as a passage to allow power from the cradle to be supplied therethrough to the mobile terminal 100 and/or may serve as a passage to allow various command signals inputted by the user from the cradle to be transferred to the mobile terminal 100 therethrough. Various command signals or power inputted from the cradle may operate as signals for recognizing that the mobile terminal 100 is properly mounted on the cradle.

The controller 180 may control operations of the mobile terminal 100. For example, the controller 180 may perform controlling and processing associated with voice calls, data communications, video calls, and/or the like. The controller 180 may include a multimedia module 181 for reproducing multimedia data. The multimedia module 181 may be configured within the controller 180 and/or may be configured to be separated from the controller 180.

The controller 180 may perform a pattern recognition processing to recognize a handwriting input or a picture drawing input performed on the touch screen as characters or images, respectively.

The power supply unit 190 may receive external power or internal power and may supply appropriate power required for operating respective elements and components under control of the controller 180.

Various embodiments described herein may be implemented in a computer-readable and/or its similar medium using, for example, software, hardware, and/or any combination thereof.

For hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform functions described herein. Such embodiments may be implemented by the controller 180 itself.

For software implementation, embodiments such as procedures or functions described herein may be implemented by separate software modules. Each software module may perform one or more functions or operations described herein. Software codes may be implemented by a software application written in any suitable programming language. The software codes may be stored in the memory 160 and executed by the controller 180.

Method for Processing User Input with Respect to Mobile Terminal

The user input units 130 may be manipulated to receive a command for controlling operation of the mobile terminal 100 and may include a plurality of manipulation units 131 and 132. The manipulation units 131 and 132 may be referred to as a manipulating portion, and various methods and techniques may be employed for the manipulation portion so long as they can be operated by the user in a tactile manner.

The display 151 can display various types of visual information. The information may be displayed in the form of characters, numerals, symbols, graphic and/or icons. In order to input such information, at least one of the characters, numerals, symbols, graphic and icons may be displayed in a predetermined arrangement in the form of a keypad. The keypad may be referred to as a 'soft key'.

The display 151 may be operated as an entire area or may be divided into a plurality of regions so as to be operated. In the latter case, the plurality of regions may operate in association with each other.

For example, an output window and an input window may be displayed at an upper portion and a lower portion of the display 151. The output window and the input window are regions allocated to output or input information, respectively. Soft keys marked by numbers for inputting a phone number and/or the like may be outputted to the input window. When a soft key is touched, a number and/or the like corresponding to the touched soft key may be displayed on the output window. When the manipulation unit is manipulated, a call connection to the phone number displayed on the output window may be attempted or text displayed on the output window may be inputted to an application.

The display 151 or a touch pad may be configured to receive a touch through scrolling. The user can move an entity displayed on the display 151, for example, a cursor or a pointer positioned on an icon or the like, by scrolling the touch pad. When the user moves his finger on the display 151 or on the touch pad, a path along which the user's finger moves may be visually displayed on the display 151. This may be useful in editing an image displayed on the display 151.

A certain function of the terminal may be executed when the display 151 (touch screen) and the touch pad are touched together within a certain time range. For example, the display 151 and the touch pad may be touched together when the user clamps the terminal body by using his thumb and index fingers. The certain function may be activation or deactivation of the display 151 or the touch pad.

Exemplary embodiments related to a control method that can be implemented in the mobile terminal 100 configured as described above may now be described with reference to the accompanying drawings. The exemplary embodiments may be solely used or may be combined to be used. The exemplary embodiments may be combined with the foregoing user interface (UI) so as to be used.

Power Management Method of a Mobile Communication Terminal and a Mobile Communication Terminal Using the Method A method may be provided for selectively powering off or resetting a mobile terminal (also referred to as a mobile communication terminal) based on a power state subsequent to when an instantaneous battery potential drop has been generated. More specifically, the mobile terminal 100 may not be immediately powered off even when an instantaneous battery potential drop has been generated and a reset may be performed when the power is restored to the threshold voltage subsequent to checking the power state while in a power-off suspend mode, thereby allowing the mobile terminal 100 to be silently restored to a standby mode (also referred to as an idle mode).

The sensing unit 140 (or detection unit) may acquire information on the power supplied by the power supply unit 190. For example, the sensing unit 140 may sense (or detect) whether (or not) power is supplied by the power supply unit 190, a level (e.g. a current level, a voltage level, etc) of power supplied by the power supply unit 190, and/or the like. More particularly, when the power supply unit 190 receives the power of a battery or battery pack and supplies power required for operation of other components, the sensing unit 140 may sense a battery voltage (or other characteristic).

The sensing unit 140 may sense a battery voltage (or another characteristic) over a predetermined period based on a control command of the controller 180, and may provide the sensed battery voltage information (or characteristic information) to the controller 180. The sensing unit 140 may sense a battery voltage over a predetermined operation period, and may provide the sensed battery voltage information in an interrupt manner to the controller 180. The sensing unit 140 may provide battery voltage information to the controller 180 only when the battery voltage varies above a predetermined range.

The period for sensing a battery voltage may vary based on the controller 180 or the sensing unit 140.

For example, the controller 180 may sense an acceleration/deceleration state of the mobile terminal 100 to regulate a sensing period based on the sensed acceleration/deceleration state. If the sensing unit 140 or acceleration sensor measures acceleration of the mobile terminal 100 and notifies the controller 180 of the measured acceleration, then the controller 180 decreases the sensing period in case of high acceleration, and increases the sensing period in case of low acceleration. It may flexibly regulate the sensing period, thereby reducing power consumption or processing resource consumption. In case of high acceleration of the mobile terminal 100, contact between a battery and a battery terminal may likely fail due to self vibration, external shock, and/or the like.

Otherwise, the sensing unit 140 including an acceleration sensor may sense an acceleration/deceleration state of the mobile terminal 100 to regulate the sensing period based on the sensed acceleration/deceleration state. The sensing unit 140 may decrease the sensing period in case of high acceleration, and increase the sensing period in case of low acceleration.

The controller 180 may receive battery voltage information (or other characteristic information) from the sensing unit 140.

The controller 180 may enter into a power-off suspend mode when battery voltage instantaneously drops. The controller 180 may enter into a power-off suspend mode only when the battery voltage is less than a predetermined voltage level for a predetermined period of time.

The battery voltage being "instantaneously" dropped may mean that battery voltage is not gradually decreased by operation of the mobile terminal 100, but rather the battery voltage may be instantaneously (or suddenly) dropped no greater than or less than a predetermined voltage level due to a particular situation, such as instantaneous contact failure between a battery and a battery terminal.

The battery voltage being "instantaneously" dropped may mean that the battery voltage gradually decreases down to a vicinity of a predetermined voltage level by operation of the mobile terminal 100 and then the battery voltage is instantaneously dropped no greater than or less than a predetermined voltage level as a result of battery voltage fluctuation based on operation of the mobile terminal 100.

The predetermined voltage level may be a reference voltage, a threshold voltage, an under voltage lockout (UVLO) voltage, and/or the like. The UVLO function may be an activation stop function for interrupting an abnormal operation of the device with a method of interrupting power output in case of very low input voltage, and/or the like. For example, the UVLO voltage may be 2.55 V, 3.5 V, and/or the like.

The controller 180 may display content (e.g. a text, an image, a character, other graphic data, etc.) notifying a power-off suspend mode on the display 151 or output a sound notifying a power-off suspend mode through the audio output module 152.

The controller 180 may selectively perform a reset or power-off based on the recovery state of the battery voltage while in the power-off suspend mode. The reset may be a silent reset of the mobile terminal 100. The reset may also be a rebooting of the mobile terminal 100.

The power-off suspend mode may be a mode in which the controller 180 observes a recovery state of the battery voltage for a predetermined period of time without immediately performing a power-off of the mobile terminal 100. The predetermined period of time may be a time period that is set by a timer based on a control command of the controller 180, a time period set by a watchdog timer, and/or a time period set by a sudden momentary power loss (operation SMPL) timer.

The controller 180 may determine whether the battery voltage that has been dropped no greater than or less than a predetermined voltage level is restored to above a normal operating level prior to passing through the time period set by a timer.

The controller 180 may perform a reset when the battery voltage is restored to above the normal operating level prior to passing through the time period set by a timer, and may perform a power-off when the battery voltage is not restored to above the normal operating level prior to passing through the time period set by a timer.

The controller 180 may not output at least one of a screen or a sound outputted normally at a time of supplying power when performing a reset of the mobile terminal 100. This may be considered a silent reset.

When the mobile terminal 100 performs a power-on or a reset, the mobile terminal 100 may output on a screen (e.g. the mobile operator/terminal manufacturer's logo/image, etc.) or output a sound (the mobile operator/terminal manufacturer's signal melody, etc.) notifying the power-on or the reset.

The mobile terminal 100 may perform a silent reset without outputting (such as on a screen or by sound), thereby allowing operation and use to be softly carried out in a state that the user can not recognize it when the reset is generated in a standby mode (idle mode) that is not a phone call mode.

The controller 180 may be automatically restored to a standby mode (idle mode) subsequent to performing a reset.

Figure 2:
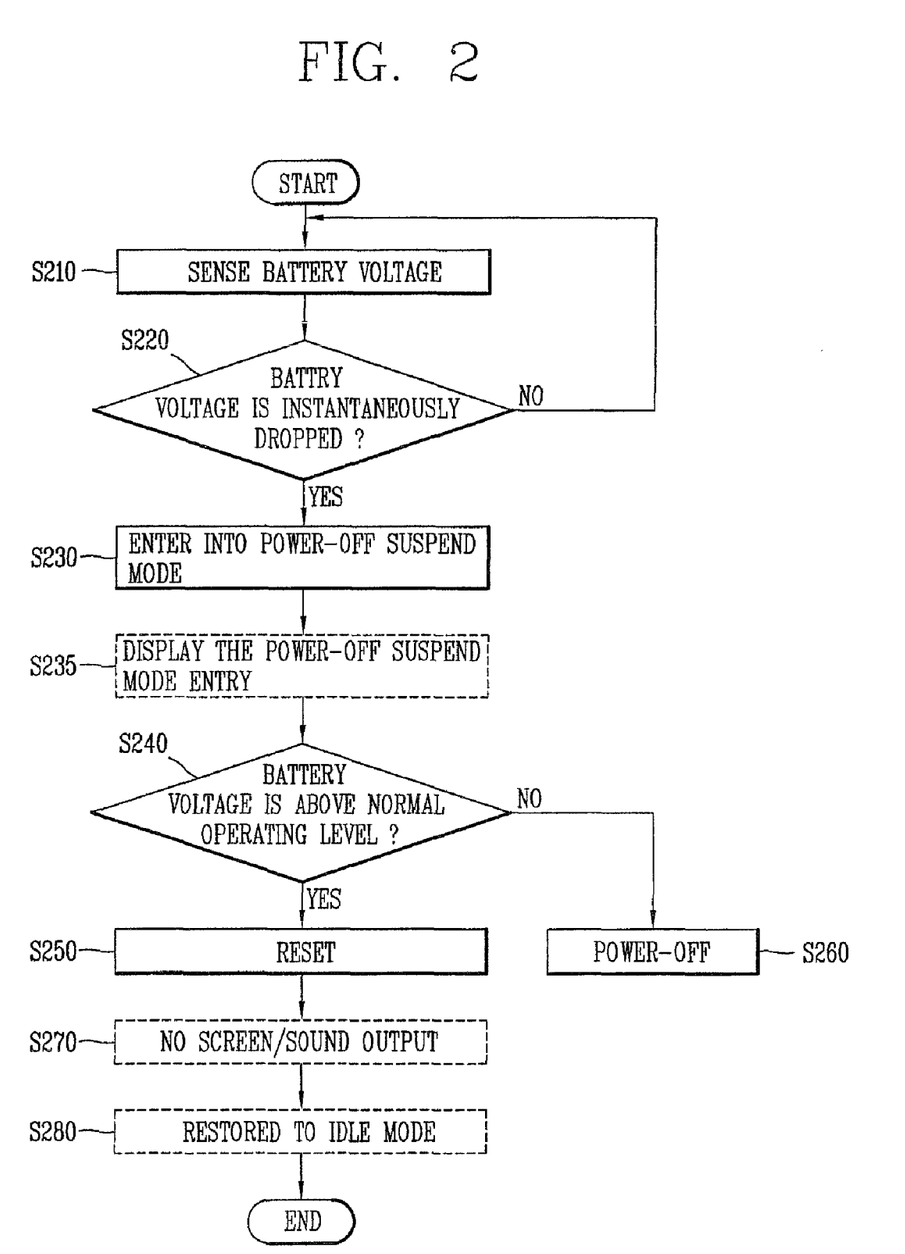
FIG. 2 is a flow chart illustrating a power management method of a mobile communication terminal according to an embodiment.

FIG. 2 is a flow chart illustrating a power management method of a mobile communication terminal according to an embodiment. Other embodiments and configurations may also be provided.

As shown in FIG. 2, the mobile terminal 100 may sense (or detect) a battery voltage (operation S210).

The mobile terminal 100 may check (or determine) whether the battery voltage (or other characteristic) is instantaneously dropped (operation S220). The mobile terminal 100 may enter into a power-off suspend mode when the battery voltage (or other characteristic) has been instantaneously dropped (operation S230). In this example, the mobile terminal 100 may enter into a power-off suspend mode only when the sensed battery voltage maintains less than a predetermined reference voltage for a predetermined period of time.

The mobile terminal 100 may display content (or information) of entering into a power-off suspend mode on the screen (operation S235).

The mobile terminal 100 may check (or determine) whether the battery voltage is restored to above a normal operating level while in the power-off suspend mode (operation S240), and then the mobile terminal 100 may perform a reset when the voltage is restored to above the normal operating level (operation S250), but perform a power-off of the mobile terminal when the voltage is not restored to above the normal operating level (operation S260). The power-off suspend mode may be a mode that maintains for a time period that is set by a timer.

The mobile terminal 100 may not output at least one of a screen and a sound outputted normally at a time of supplying power when performing the reset (operation S270). This may be referred to as a silent reset. Alternatively, the mobile terminal 100 may be restored to an idle mode subsequent to the reset operation (operation S280).

The power management method may be understood similarly to a mobile terminal that has been described according to the foregoing embodiment, and the detailed description may be omitted below.

Figure 3:
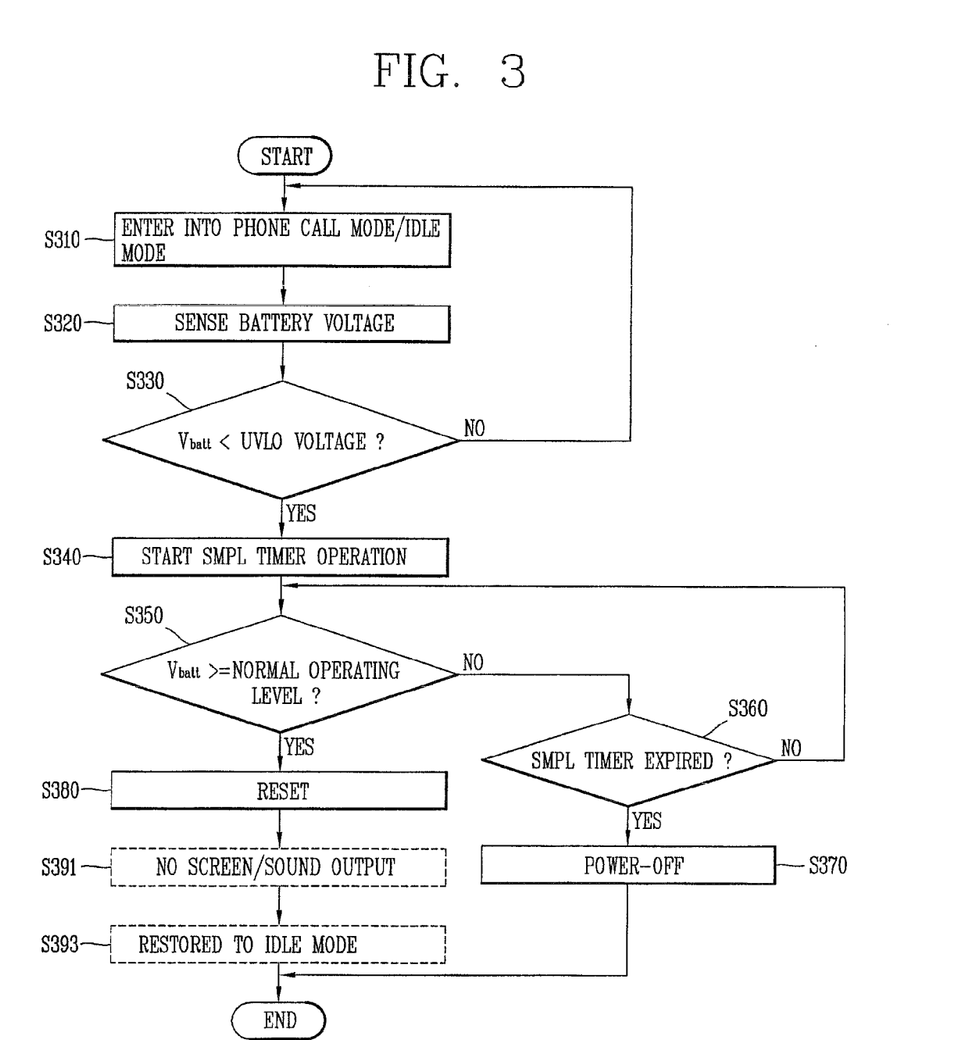
FIG. 3 is a flow chart illustrating a power management method of a mobile communication terminal according to an embodiment.

FIG. 3 is a flow chart illustrating a power management method of a mobile communication terminal according to an embodiment. Other embodiments and configurations may also be provided.

As shown in FIG. 3, the mobile terminal 100 may enter into a phone call mode (or idle mode) based on the user's operation state (operation S310). The mobile terminal 100 may sense (or detect) a battery voltage (operation S320) or other characteristic.

The mobile terminal 100 may check (or determine) whether the battery voltage ($V_{batt}$) is dropped no greater than or less than the UVLO voltage (operation S330), and then start the operation of a SMPL timer when the battery voltage ($V_{batt}$) is dropped no greater than or less than the UVLO voltage (operation S340), thereby entering into a power-off suspend mode. Although not shown in FIG. 3, the mobile terminal 100 may start operation of a SMPL timer only when the sensed battery voltage (or other characteristic) maintains no greater than or less than the UVLO voltage for a predetermined period of time.

The mobile terminal 100 may check (or determine) whether the battery voltage ($V_{batt}$) is no less than a normal operating level (for example, UVLO voltage or a voltage obtained by adding a predetermined value to the UVLO voltage) (operation S350).

If the battery voltage ($V_{batt}$) is not restored to above the normal operating level, then the mobile terminal 100 may determine whether the SMPL timer has expired (operation S360). The mobile terminal 100 may check (or determine) the battery voltage ($V_{batt}$) again when the SMPL timer has not expired (operation S350), and the mobile terminal 100 may perform a power-off when the SMPL timer has expired (operation S370).

If the battery voltage ($V_{batt}$) is restored to above the normal operating level, than the mobile terminal 100 may perform a reset (operation S380). This may be a silent reset or a reboot.

The mobile terminal 100 may not output at least one of a screen and a sound outputted normally at a time of supplying power when performing the reset (operation S391). Alternatively, the mobile terminal 100 may be restored to an idle mode subsequent to the reset operation (operation S393).

Figure 4:
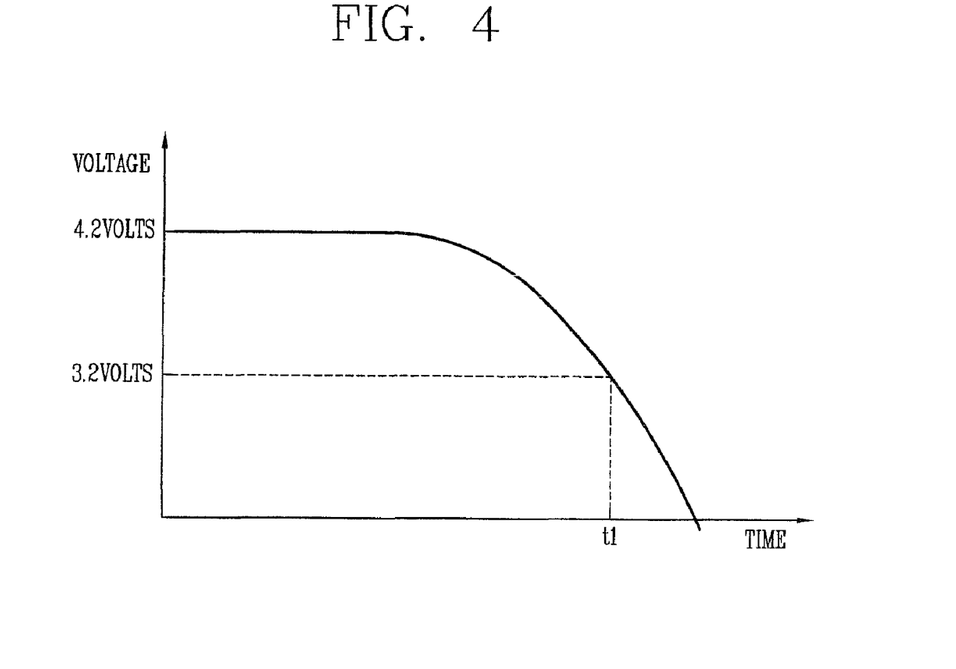
FIG. 4 is a graph showing a voltage drop below a predetermined voltage.

FIG. 4 is a graph showing a voltage drop below a prescribed voltage. For example, FIG. 4 shows an embodiment in which the mobile terminal 100 may be operating normal where the sensed voltage of the battery is 4.2 volts. When the sensed voltage falls below a prescribed voltage, such as 3.2 volts, then the mobile terminal 100 may enter into a power-off suspend mode. For example, the mobile terminal 100 may enter the power-off suspend mode at time t1.

While in the power-off suspend mode, the sensing unit 140 may further sense the battery voltage. The further sensing may be continuously sensing the battery voltage or sensing the voltage of the battery at prescribed intervals. When the further sensed battery voltage rises above the prescribed voltage, such as 3.2 volts (or another voltage), while in the power-off suspend mode, then the mobile terminal 100 may perform a reset (such as a silent reset and/or a rebooting of the mobile terminal 100). The display may display information regarding a reset when the controller performs the reset of the mobile terminal 100. On the other hand, when the further sensed battery voltage remains below the prescribed voltage, such as 3.2 volts (or another voltage), while in the power-off suspend mode, then the mobile terminal 100 may perform a power-off.

Figure 5:
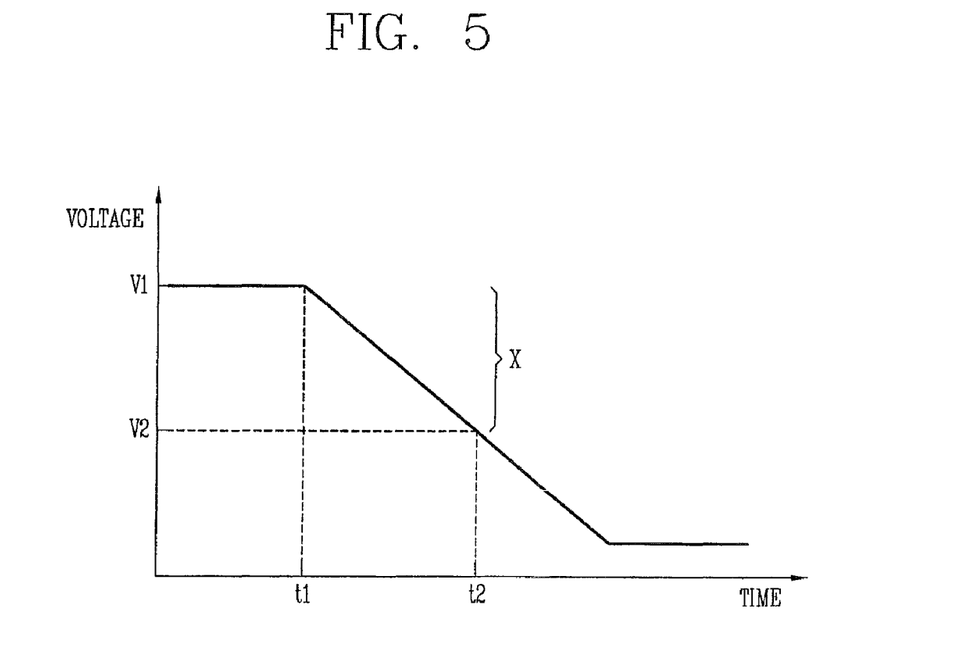
FIG. 5 is a graph showing an instantaneous drop of voltage within a prescribed time.

FIG. 5 is a graph showing an instantaneous drop of battery voltage within a prescribed time. For example, FIG. 5 shows an embodiment in the mobile terminal 100 may be operating normal and a sensed voltage of the battery decreases more than a prescribed amount (shown as X) within a predetermined amount of time. In FIG. 5, the sensed voltage of the battery decreases by an amount of X (which is V1-V2) within a prescribed amount of time. The prescribed amount of time may be predetermined.

When the sensed voltage decreases more than X (i.e., the prescribed amount) within a predetermined amount of time (such as a time period of t1 to t2), then the mobile terminal 100 may be provided in a power-off suspend mode.

While in the power-off suspend mode, the sensing unit 140 may further sense the battery voltage. The further sensing may be continuously sensing the battery voltage or may be sensing the voltage of the battery at prescribed intervals, where each interval corresponds to the predetermined amount of time.

When the further sensed battery voltage rises above a predetermined value while the mobile terminal 100 is in the power-off suspend mode, then the mobile terminal 100 may perform a reset (such as a silent reset and/or a rebooting of the mobile terminal). The display may display information regarding a reset when the controller performs the reset of the mobile terminal 100. On the other hand, when the further sensed battery voltage remains below the predetermined value while the mobile terminal is in the power-off suspend mode, then the mobile terminal 100 may perform a power-off.

While each of FIGS. 4-5 relate to a sensed battery voltage of the mobile terminal 100, embodiments are also applicable to other characteristics of a battery coupled to the mobile terminal 100.

Embodiments of the present disclosure may provide a power management method capable of minimizing a user's inconvenience in use of a terminal even when an instantaneous battery potential drop has been generated.

A power management method of a mobile communication terminal may include sensing a battery voltage, entering into a power-off suspend mode when the battery voltage is instantaneously dropped, and selectively performing a reset or power-off based on a recovery state of the battery voltage in the power-off suspend mode.

A reset may be performed when the battery voltage is recovered above a normal operating level in the power-off suspend mode, and a power-off may be performed when the battery voltage is not recovered to above the normal operating level.

The power-off suspend mode may be a mode that maintains for a period of time that is set by a timer.

A mobile communication terminal may include a sensing unit for sensing a battery voltage, and a controller for entering into a power-off suspend mode to selectively perform a reset or power-off based on a recovery state of the battery voltage in the power-off suspend mode when the battery voltage instantaneously drops.

The terminal may not be immediately powered off even when an instantaneous battery potential drop is generated and a reset may be performed when the power is restored to above the threshold voltage subsequent to checking the power state in the power-off suspend mode, thereby allowing the mobile communication terminal to be silently restored to a standby mode (idle mode).

A mobile communication terminal may be selectively powered off or reset based on a power state when an instantaneous battery potential drop is generated, thereby minimizing an inconvenience in which the user should power on the mobile communication terminal each time.

Furthermore, according to an embodiment, the foregoing method may be implemented as codes readable by a computer on a medium written by the program. Examples of the computer-readable media may include ROM, RAM, CD-ROM, magnetic tape, floppy disk, and optical data storage device, and/or the like, and also include a device implemented via a carrier wave (for example, a transmission via the Internet). Configurations and methods according to the above-described embodiments may not be applicable in a limited way to the foregoing terminal, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements within the subject combination arrangement within the scope of the disclosure, the drawings and the appended claims. In addition to variations and modifications in the component parts and/or arrangements, alternative uses will also be apparent to those skilled in the art.

What is claimed is:

1. A power management method of a mobile communication terminal, the method comprising:
   sensing a characteristic of a battery coupled to the mobile communication terminal;
   detecting when the sensed battery characteristic falls below a predetermined value;
   further sensing the characteristic of the battery after the detection;
   automatically restarting the mobile communication terminal when the further sensed characteristic rises at least to the predetermined value within a prescribed amount of time; and
   performing a power-off of the mobile communication terminal when the further sensed characteristic remains below the predetermined value for the prescribed amount of time.

2. The method of claim 1, wherein the sensed characteristic is a voltage of the battery and the predetermined value is a normal operating level of the battery.

3. The method of claim 2, wherein sensing the characteristic includes sensing the voltage of the battery at prescribed intervals.

4. The method of claim 1, wherein further sensing the characteristic includes continuously sensing the characteristic of the battery.

5. The method of claim 1, further comprising outputting a notification when the sensed battery characteristic falls below the predetermined value, wherein the notification includes one of a text, an image, a vibration, or a sound.

6. The method of claim 1, wherein automatically restarting the mobile terminal includes performing a silent reset of the mobile communication terminal.

7. The method of claim 1, wherein automatically restarting the mobile terminal includes rebooting the mobile communication terminal.

8. The method of claim 1, wherein the mobile communication terminal maintains at least one setting when the mobile communication terminal is restarted.

9. The method of claim 8, wherein the at least one setting is a volume setting.

10. The method of claim 1, wherein the mobile communication terminal changes at least one setting when the mobile communication terminal is restarted.

11. The method of claim 10, wherein the at least one setting is a volume setting, and wherein when the mobile communication terminal is restarted the volume setting is changed such that the mobile communication terminal reboots silently.

12. A power management method of a mobile communication terminal, the method comprising:
    sensing a voltage of a battery coupled to the mobile communication terminal;
    detecting when the sensed voltage of the battery decreases more than a prescribed amount;
    powering-off the mobile communication terminal when the sensed voltage of the battery decreases more than the prescribed amount;
    automatically powering-on the mobile communication terminal when the sensed voltage rises at least to a predetermined value within a prescribed amount of time prior to the mobile communication terminal being powered-off; and
    maintaining the power-off state of the mobile communication terminal when the sensed voltage remains below the predetermined value for the prescribed amount of time.

13. The method of claim 12, wherein sensing the voltage includes sensing the voltage of the battery at prescribed intervals, and detecting the sensed voltage of the battery includes detecting that the sensed voltage of the battery decreases more than the prescribed amount within a predetermined amount of time, each interval corresponding to the predetermined amount of time.

14. The method of claim 12, further comprising further sensing the voltage of the battery after detecting that the sensed voltage of the batter has decreased more than the prescribed amount, wherein the further sensing includes continuously sensing the voltage of the battery.

15. The method of claim 12, further comprising outputting a notification when the sensed battery characteristic falls below a predetermined value, wherein the notification includes one of a text, an image, a vibration, or a sound.

16. The method of claim 12, wherein automatically powering-on the mobile communication terminal includes performing a silent reset of the mobile communication terminal.

17. The method of claim 12, wherein automatically powering-on the mobile communication terminal includes rebooting the mobile communication terminal.

18. The method of claim 12, wherein the mobile communication terminal maintains at least one setting when the mobile communication terminal is restarted.

19. The method of claim 18, wherein the at least one setting is a volume setting.

20. The method of claim 12, wherein the mobile communication terminal changes at least one setting when the mobile communication terminal is restarted.

21. The method of claim 20, wherein the at least one setting is a volume setting, and wherein when the mobile communication terminal is restarted the volume setting is changed such that the mobile communication terminal reboots silently.

22. A mobile communication terminal comprising:
    a sensing unit to sense a characteristic of a battery coupled to the mobile communication terminal; and
    a controller to detect when the sensing unit senses that the sensed battery characteristic falls below a predetermined value, the sensing unit to further sense the characteristic of the battery after the detection,
    the controller to automatically restart the mobile communication terminal when the further sensed characteristic rises at least to the predetermined value within a prescribed amount of time, and the controller to perform a power-off of the mobile communication terminal when the further sensed characteristic remains below the predetermined value for the prescribed amount of time.

23. The mobile communication terminal of claim 22, wherein the sensed characteristic is a voltage of the battery and the predetermined value is a normal operating level of the battery.

24. The mobile communication terminal of claim 23, wherein the sensing unit to sense the characteristic includes the sensing unit to sense the voltage of the battery at prescribed intervals.

25. The mobile communication terminal of claim 22, wherein the sensing unit to further sense the characteristic includes the sensing unit to continuously sense the characteristic of the battery.

26. The mobile communication terminal of claim 22, further comprising a display to display information notifying when the sensed battery characteristic falls below the predetermined value.

27. The mobile communication terminal of claim 22, wherein the controller to automatically restart the mobile communication terminal includes the controller to perform a silent reset of the mobile communication terminal.

28. The mobile communication terminal of claim 22, wherein the controller to automatically restart the mobile communication terminal includes the controller to reboot the mobile communication terminal.

29. A mobile communication terminal comprising:
a sensing unit to sense a voltage of a battery coupled to the mobile communication terminal; and
a controller to detect when the sensing unit senses that the sensed voltage of the battery decreases more than a prescribed amount, the sensing unit to power-off the mobile communication terminal when the sensed voltage of the battery decreases more than the prescribed amount, the controller to automatically power-on the mobile communication terminal when the sensed voltage rises at least to a predetermined value within a prescribed amount of time prior to the mobile communication terminal being powered-off, and the controller to maintain the power-off state of the mobile communication terminal when the sensed voltage remains below the predetermined value for the prescribed amount of time.

30. The mobile communication terminal of claim 29, wherein the sensing unit to further sense the voltage includes the sensing unit to sense the voltage of the battery at prescribed intervals, and the controller to detect when the sensing unit senses that the sensed voltage of the battery decreases more than the prescribed amount detects the voltage decrease within a predetermined amount of time, each interval corresponding to the predetermined amount of time.

31. The mobile communication terminal of claim 30, wherein the controller to automatically power-on the mobile communication terminal includes the controller to perform a silent reset of the mobile communication terminal.

32. The mobile communication terminal of claim 30, wherein the controller to automatically power-on the mobile communication terminal includes the controller to reboot the mobile communication terminal.

33. The mobile communication terminal of claim 29, wherein the sensing unit includes the sensing unit to further sense the voltage of the battery after detecting that the sensed voltage of the battery has decreased more than the prescribed amount and includes the sensing unit to continuously sense the voltage of the battery.

34. The mobile communication terminal of claim 29, further comprising a display to display information notifying entering of the power-off suspend mode when the sensed voltage of the battery decreases more than a prescribed amount.

35. A method of controlling a mobile communication terminal, comprising:
sensing a voltage level of a battery connected to the mobile communication terminal;
detecting when the sensed voltage drops below a predetermined level for a prescribed amount of time, wherein the detected voltage drop causes the mobile communication terminal to begin powering-off;
selectively restarting the mobile communication terminal based on the detected voltage drop, wherein when the detected voltage drops below the predetermined level for less than the prescribed amount of time, automatically rebooting the mobile communication terminal, and
when the detected voltage drops below the predetermined level for at least the prescribed amount of time, maintaining a power-off state of the mobile communication terminal.

* * * * *